(12) United States Patent
Couillard et al.

(10) Patent No.: US 12,278,594 B1
(45) Date of Patent: Apr. 15, 2025

(54) SOLAR PANEL SUPPORT STRUCTURE

(71) Applicant: Couillard Solar Foundation, Inc., Deerfield, WI (US)

(72) Inventors: Cal L. Couillard, Deerfield, WI (US); Amer B. Arafat, Madison, WI (US)

(73) Assignee: Couillard Solar Foundation, Inc., Deerfield, WI (US)

( * ) Notice: Subject to any disclaimer, the term of this patent is extended or adjusted under 35 U.S.C. 154(b) by 0 days.

(21) Appl. No.: 18/679,868

(22) Filed: May 31, 2024

Related U.S. Application Data

(60) Provisional application No. 63/470,401, filed on Jun. 1, 2023.

(51) Int. Cl.
*H02S 30/10* (2014.01)
*H02S 40/22* (2014.01)
*F16B 5/12* (2006.01)

(52) U.S. Cl.
CPC .............. *H02S 30/10* (2014.12); *H02S 40/22* (2014.12); *F16B 5/121* (2013.01)

(58) Field of Classification Search
CPC .......... H02S 30/10; H02S 40/22; F16B 5/121; F16B 2/065; Y10T 403/7067; Y02E 10/47; Y02B 10/20
See application file for complete search history.

(56) References Cited

U.S. PATENT DOCUMENTS

| | | | | |
|---|---|---|---|---|
| 4,054,268 A | * | 10/1977 | Sher | E04F 11/1812 256/67 |
| 7,513,080 B1 | * | 4/2009 | Showalter | E04D 13/10 52/24 |
| 7,748,175 B2 | | 7/2010 | Liebendorfer | |
| 7,758,011 B2 | * | 7/2010 | Haddock | F24S 25/636 248/500 |
| 7,856,769 B2 | | 12/2010 | Plaisted et al. | |
| 8,176,693 B2 | | 5/2012 | Abbott et al. | |
| 8,464,478 B2 | * | 6/2013 | Tweedie | F24S 25/632 52/173.3 |
| 8,621,792 B2 | | 1/2014 | Zante | |

(Continued)

FOREIGN PATENT DOCUMENTS

| | | |
|---|---|---|
| CN | 202585459 U | 12/2012 |
| CN | 206835040 U | 1/2018 |

(Continued)

*Primary Examiner* — Ko H Chan
(74) *Attorney, Agent, or Firm* — Stiennon & Stiennon

(57) ABSTRACT

A solar panel support structure has two inclined extruded first members with upper heads and lower parts fastened by brackets to horizontal beams. Clamping members with diamond shaped bases extend into the first member heads which communicate with upper and lower tapped holes. The heads have lips disposed to underlie a solar panel extending between the two first members. Set screws with conical interior ends are insertable into the holes. When the screws are in the lower holes, the clamping member flanges are spaced above a solar panel. When in the upper holes, the set screws hold the clamping member flange secured against the solar panel. The first members have U-shaped channels which receive water which is captured in a rain tray extending between the first members. For extending the panel support additional first members with two cylindrical splicing channels allow a lengthened support surface.

13 Claims, 5 Drawing Sheets

(56) References Cited

U.S. PATENT DOCUMENTS

| | | |
|---|---|---|
| 8,813,441 B2 | 8/2014 | Rizzo |
| 8,844,234 B2* | 9/2014 | Haddock ............... F16B 5/0096 |
| | | 52/545 |
| 8,910,928 B2* | 12/2014 | Header ................... F16B 2/065 |
| | | 52/24 |
| 9,051,950 B2 | 6/2015 | Jaffari |
| 9,067,765 B2* | 6/2015 | Spies ....................... B66C 7/02 |
| 9,584,062 B2 | 2/2017 | Ganshaw et al. |
| 9,617,733 B2 | 4/2017 | Grisé et al. |
| 9,777,484 B2* | 10/2017 | Header ............... E04F 11/1853 |
| 10,211,773 B2 | 2/2019 | Jasmin et al. |
| 10,340,837 B2 | 7/2019 | Wildes et al. |
| 10,476,425 B2 | 11/2019 | Stearns et al. |
| 10,873,290 B2 | 12/2020 | Olson |
| 10,920,424 B2 | 2/2021 | Jones et al. |
| 11,015,627 B2 | 5/2021 | Park et al. |
| 11,251,743 B2 | 2/2022 | Schuit et al. |
| 12,203,496 B2* | 1/2025 | Moss .................... H02S 30/00 |
| 2008/0121273 A1* | 5/2008 | Plaisted ................. H02S 20/24 |
| | | 136/251 |
| 2009/0282755 A1 | 11/2009 | Abbott et al. |
| 2011/0094559 A1 | 4/2011 | Potter et al. |
| 2011/0214365 A1 | 9/2011 | Aftanas |
| 2012/0175322 A1 | 7/2012 | Park et al. |
| 2014/0041321 A1 | 2/2014 | Poivet |
| 2016/0079909 A1 | 3/2016 | Franklin et al. |
| 2017/0104442 A1 | 4/2017 | MacRostie et al. |
| 2020/0157786 A1* | 5/2020 | Emmett ................ E03C 1/0401 |
| 2023/0188084 A1 | 6/2023 | Wentworth et al. |

FOREIGN PATENT DOCUMENTS

| | | |
|---|---|---|
| CN | 212969561 U | 4/2021 |
| CN | 214785440 U | 11/2021 |
| CN | 216721223 U | 6/2022 |
| CN | 217711437 U | 11/2022 |
| DE | 202008015017 U | 1/2009 |
| EP | 2725309 A1 | 4/2014 |
| KR | 20140078797 A | 6/2014 |
| KR | 102358779 B1 | 2/2022 |
| TW | M594310 U | 4/2020 |
| WO | 2014159566 A1 | 10/2014 |
| WO | 2016064912 A1 | 4/2016 |
| WO | 2019040986 A1 | 3/2019 |

* cited by examiner

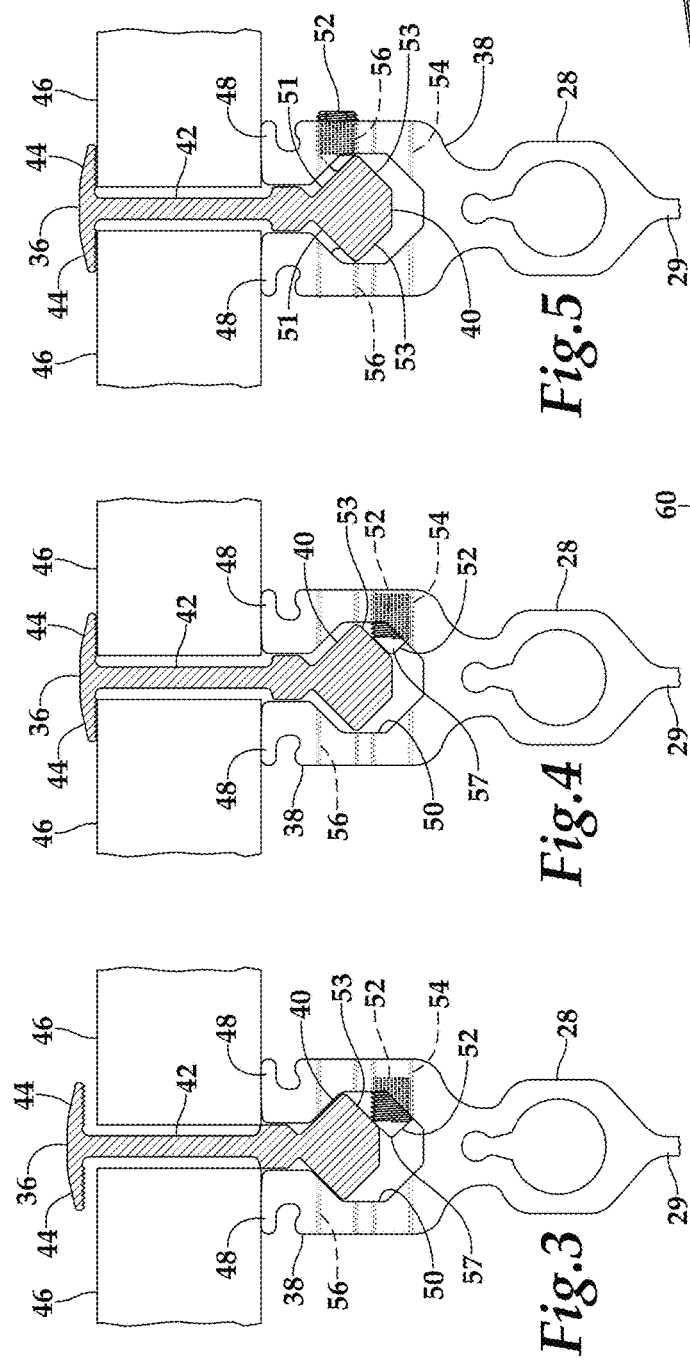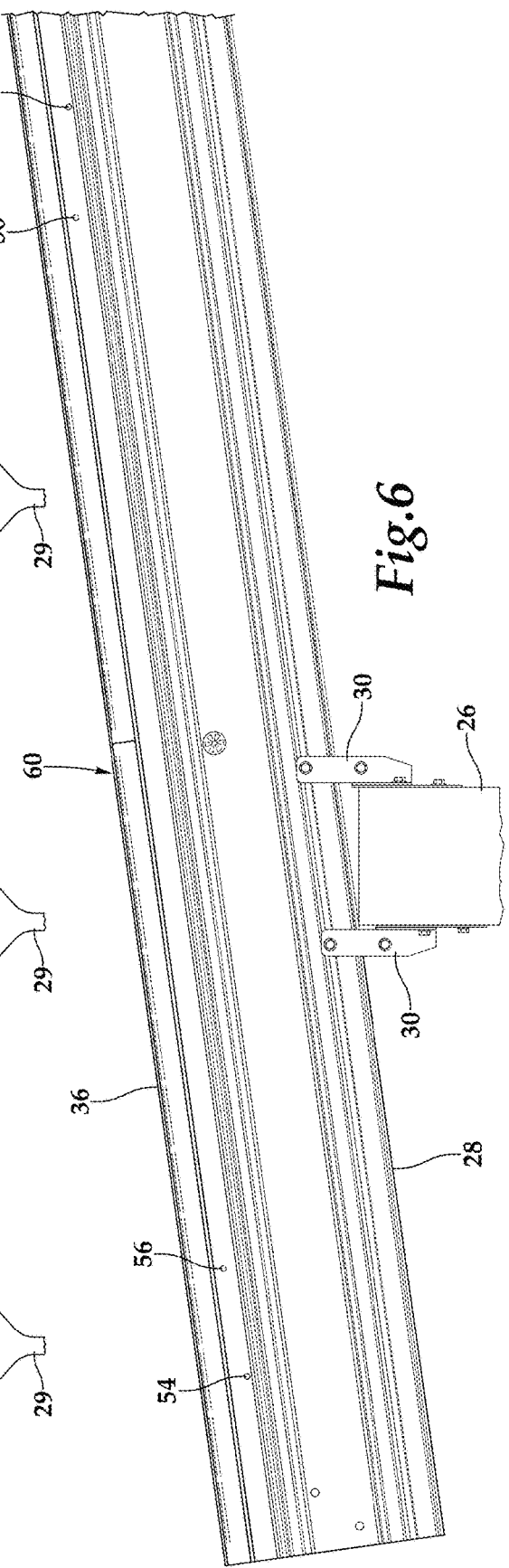

SOLAR PANEL SUPPORT STRUCTURE

CROSS REFERENCES TO RELATED APPLICATIONS

This application claims the benefit of priority of provisional U.S. App. No. 63/470,401, filed Jun. 1, 2023, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to structures which support solar panels. Solar panels can be an effective source of electric power. With improving technology and manufacturing, the costs for the photovoltaic cells continually decreases. However, the solar panels are only a part of the costs attached to this technology. The panels must be supported in the correct orientation with respect to the sun, and are preferably positioned to avoid interfering with other uses of the land.

What is needed is a structure which supports solar panels that can be quickly and effectively assembled into an arrangement that gives effective use of the structure for other purposes.

SUMMARY OF THE INVENTION

A solar panel support structure has two inclined extruded first members each fastened by brackets to horizontal beams. A clamping member is received in a head of each of the first members, the clamping member having a diamond shaped base. Each first member has upper and lower tapped holes which open into a channel within an upwardly extending head of the first member. Portions of each first member head define a lip disposed to underlie a solar panel extending between the two first members. Set screws with conical interior ends are insertable into the upper and lower holes, such that when the set screws are positioned in the lower set screw holes in the first members, the clamping member is supported with a clamping member flange spaced above a solar panel, and when the set screws are disposed in upper set screw holes in the first members, the clamping member flange is secured against the solar panel. The first members have U-shaped channels which receive water which is captured in a rain tray extending between the first members.

It is an object of the present invention to provide a structure which supports solar panels in an effective manner permitting the use of the space beneath the panels.

It is another object of the present invention to provide a structure for supporting solar panels which can be erected by securing the panels from beneath the top surface of the panels.

Further objects, features and advantages of the invention will be apparent from the following detailed description when taken in conjunction with the accompanying drawings.

BRIEF DESCRIPTION OF THE DRAWINGS

FIG. 3 is a fragmentary front view of the arrangement of FIG. 2 aligned with the main extrusion, showing the clamping beam in an elevated condition for loading of solar panels into the structure.

FIG. 4 is a fragmentary front view of the arrangement of FIG. 3 with the clamping beam supported for advancement into a clamped configuration about the solar panels.

FIG. 5 is a fragmentary front view of the arrangement of FIG. 4 with the clamping beam secured in a clamped configuration about the solar panels.

FIG. 6 is a side elevational view of the structure of FIG. 5.

DESCRIPTION OF THE PREFERRED EMBODIMENTS

Figure 1:
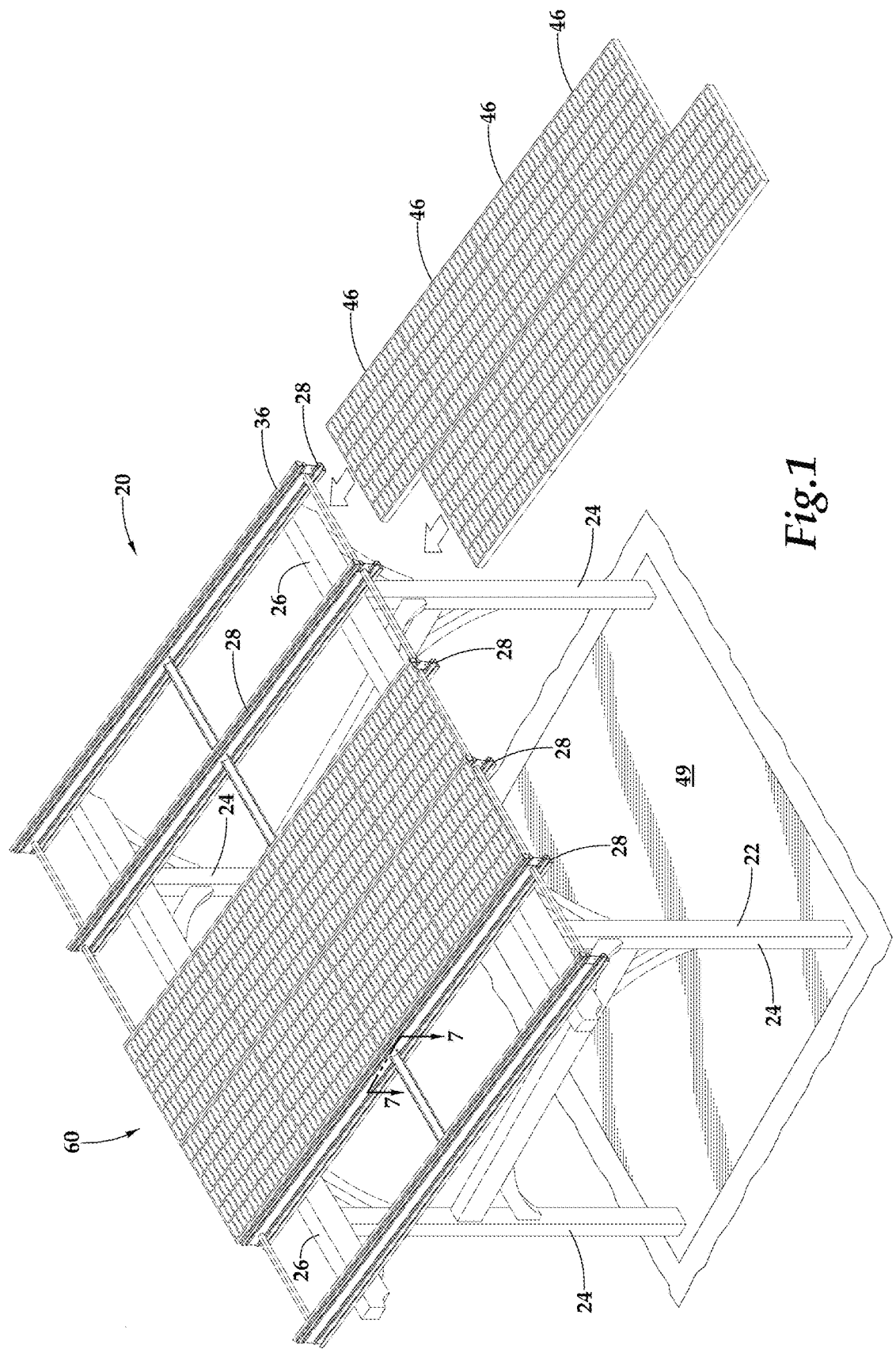
FIG. 1 is a top exploded isometric view of the structure of the invention with solar panels mounted in place.
Figure 2:
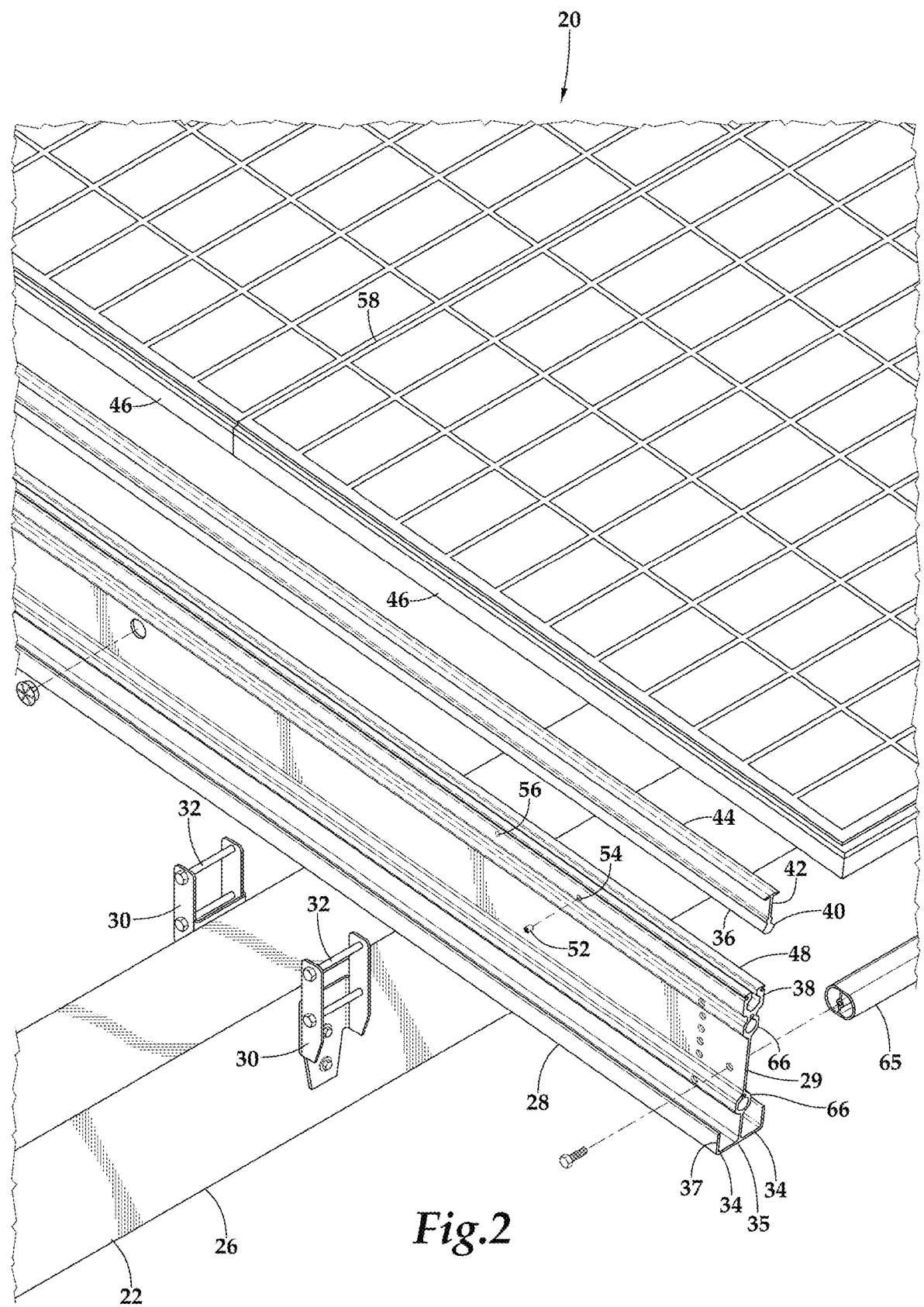
FIG. 2 is a fragmentary isometric view of the structure of FIG. 1.

Referring more particularly to FIGS. 1-9, wherein like numbers refer to similar parts, as shown in FIG. 1, the solar panel support structure 20 of this invention has a wooden frame 22 with vertical posts 24 which support inclined wooden beams 26 positioned horizontally, one at a higher elevation than the other. The solar panels 46 may be supported at an angle which is preferably 4-10 degrees from the horizontal. It is noted that higher inclinations, for example above 15-20 degrees, minimize the value of the space below by allowing excessive rain penetration on the high side and increase wind loads. Extruded aluminum members or main beams 28 run between the two horizontal wooden beams 26. As shown in FIGS. 2 and 6, the aluminum member 28 is supported at each horizontal beam by two sheet metal brackets 30, which are fastened to the wooden beam and the aluminum member 28 by bolts 32. As shown in FIG. 2, the main beams 28 have an upwardly opening head 38 connected by a central web 29 to lower drip channels 34. Lower U-shaped extruded aluminum drip channels 34 open upwardly on either side of the central web 29. Each drip channel 34 is defined by the central web 29, a horizontal flange 35 and an upwardly extending outer flange 37. Two cylindrical splicing channels 66 are positioned in the central 29 between the head 38 and the drip channels 34.

As shown in FIGS. 3-5, extruded aluminum clamping beams 36 are received in an upwardly opening channel 50 in an upper head 38 at the top of each aluminum member 28. Each clamping beam 36 has a base 40 which is roughly diamond-shaped in profile from which a web 42 extends upwardly. The diamond-shaped base 40 has inclined upper surfaces 51 and inclined lower surfaces 53. The web 42 is terminated by a flange 44 extending on both sides. A solar panel 46 rests on the upper lip 48 of the aluminum member 28 head 38 and is thus supported between two aluminum members 28. The solar panels 46 are preferably bifacial, so not only the light striking the upper surface of the panel is used to generate electricity, but also the light reflected from the ground striking the underside of the panels generates electricity. As shown in FIG. 1, the structure may be built above a concrete pad 49 which serves to reflect sunlight upwardly to the undersides of the solar panels. As shown in FIGS. 3-5, the clamping beam 36 base is received within the channel 50 in the member 28.

For simplicity of installation, the aluminum members 28 are first fastened to the underlying wooden beams by the brackets 30 and the clamping beams 36 are engaged to the members 28 to thereby define parallel upwardly extending channels into which the solar panels 46 can be slid from below as shown in FIG. 1. In this phase of the construction, the clamping beams 36 are supported within the channel 50 by set screws 52 which extend through lower threaded holes 54, shown in FIG. 6, in the head 38 of the member 28. The set screws may have hex heads such as the Allen® hex head. As shown in FIG. 3, the threaded set screws 52 have conical interior ends 57 which engage against the beveled lower surfaces 53 of the clamping beam base 40, and thereby support the clamping beam 36 in an elevated configuration in which the flanges 44 of the clamping beam are spaced above the lips 48 of the head to be spaced above the solar panel 46. With the set screws 52 disposed in the lower holes 54, the solar panels have adequate clearance to be readily slid into place, as shown in FIG. 1.

Once the solar panels 46 are in place, as shown in FIG. 4, the set screws 52 are retracted from the lower holes 54, thereby gently lowering the flanges 44 of the clamping beam 36 to rest on the solar panels. The set screws 52 may then be removed from the lower holes 54 and threadedly positioned in the threaded upper holes 56, as shown in FIG. 5, and advanced, thereby bringing the conical ends 57 of the set screws 52 into engagement with the inclined upper surface 51 of the clamping beam base 40, thereby causing the entire clamping beam to lower and bringing the flange 44 of the clamping beam into clamping engagement with the solar panel 46, to securely clamp the solar panel between the clamping beam flange and the lip 48 of the member 28. The same set screws 52 may be used in both sets of holes, by moving them from one set of holes to another as needed.

Figure 7:
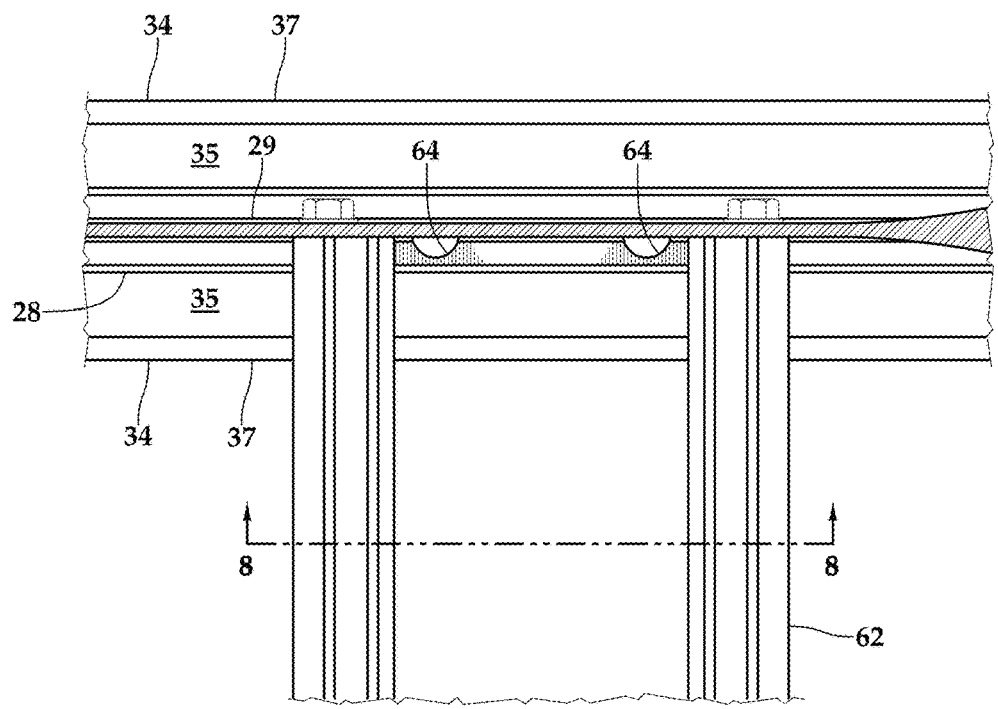
FIG. 7 is a fragmentary cross-sectional view of the arrangement of FIG. 1 taken along section line 7-7.
Figure 8:
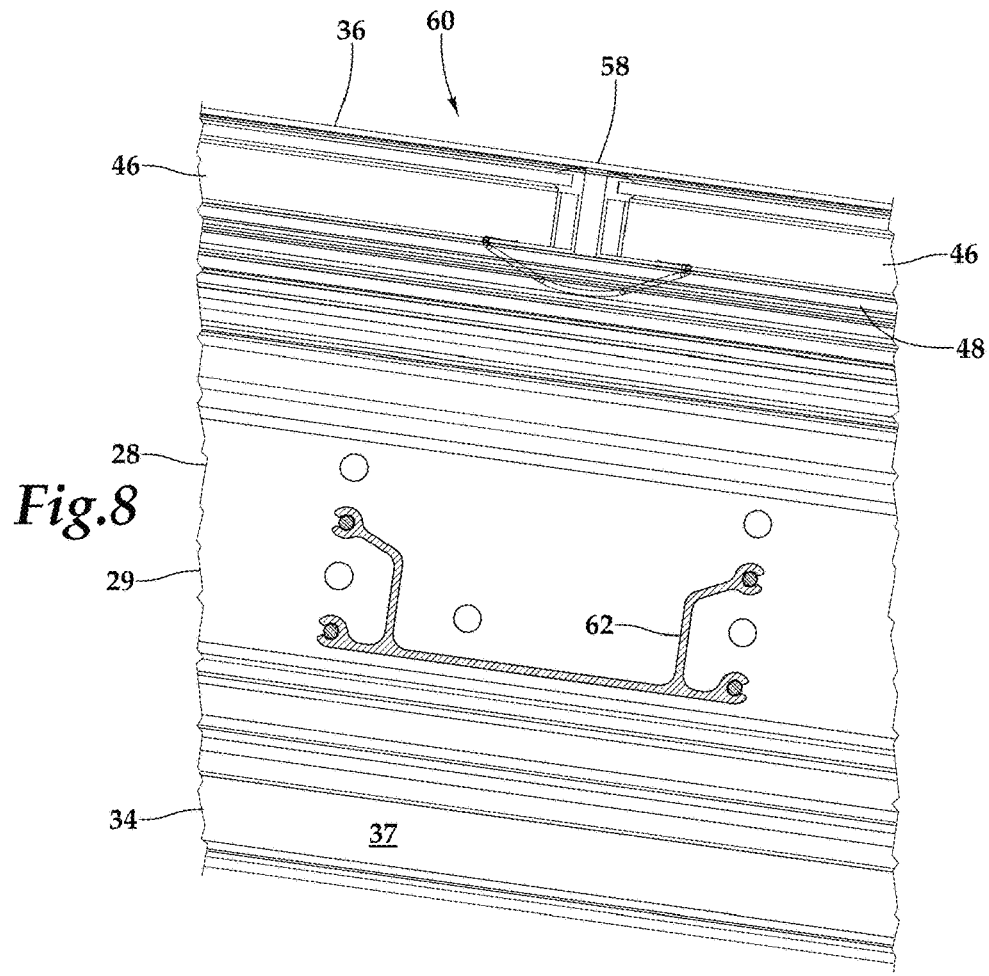
FIG. 8 is a fragmentary cross-sectional view of the arrangement of FIG. 7 taken along section line 8-8.

As shown in FIGS. 1 and 8, two or more solar panels 46 can be received between two parallel inclined aluminum members 28 and abutted at a joint 58 where a resilient gasket (not shown) is positioned. The gasket may be a strip of ¾ to 1" wide and ⅛" thick foam rubber, applied to one of the abutting solar panels and acting as a seal between the two panels. The support structure 20, together with the solar panels 46 thus forms a canopy 60 which can provide shade and shelter from the elements for occupants stationed below. To control the runoff of rain from the solar panels, a tray 62, shown in FIGS. 7 and 8, is fastened with bolts to extend between two parallel aluminum members 28, each tray being positioned beneath a joint 58 as shown in FIG. 8. As shown in FIG. 7, the trays 62 have drip holes 64 with a diameter of ⅓" to ⅝" positioned in its lower position at each end of the tray 62 where it overlies one of the channels 34, thereby serving to collect and channel the rain falling on the solar panels.

As shown in FIG. 2, to retain a constant spacing between the aluminum members 28 and thereby keep them substantially parallel, tie bars 65 are fastened with bolts between each pair of aluminum members.

Figure 9:
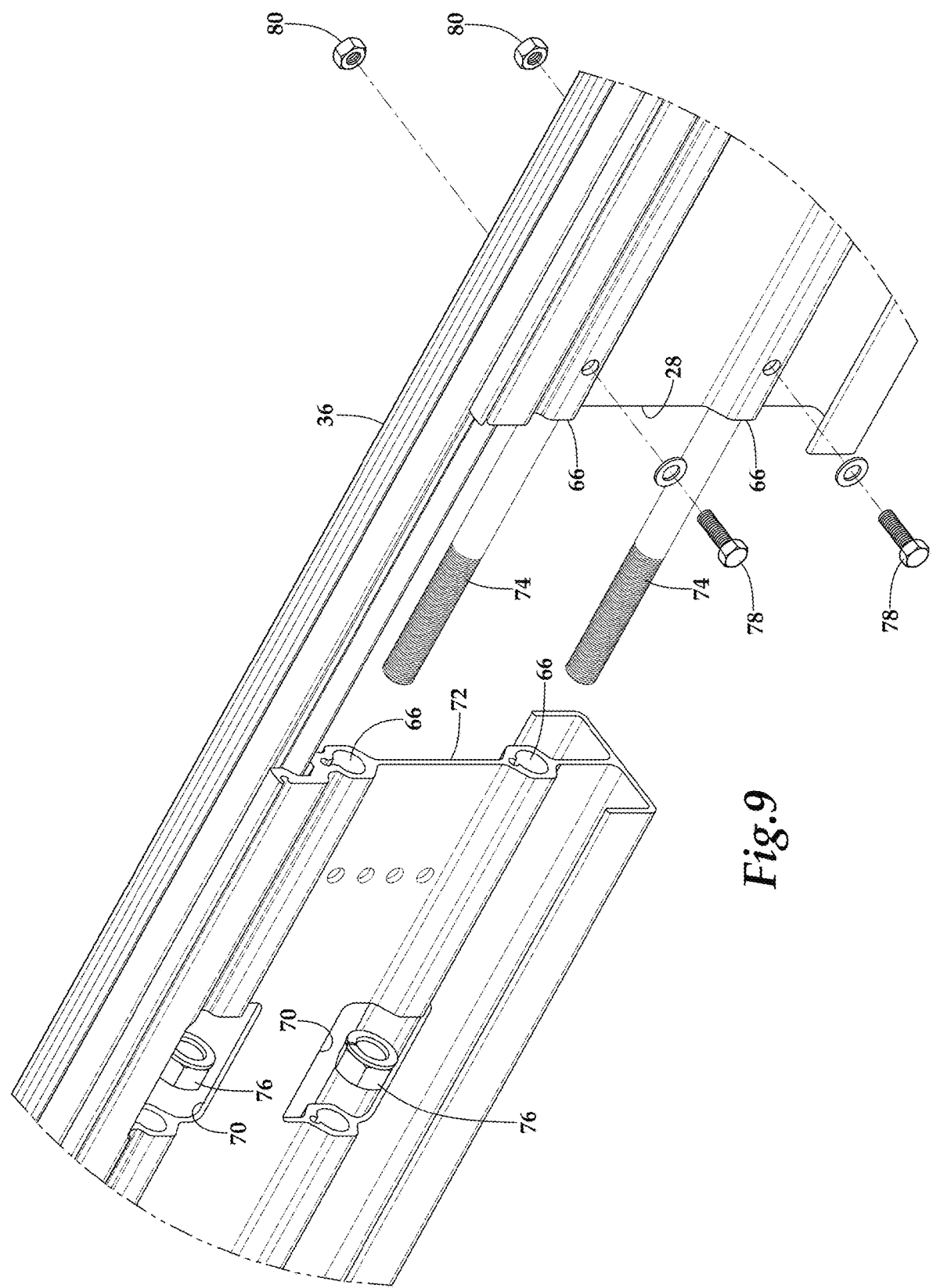
FIG. 9 is an exploded, fragmentary isometric view of an extension member spliced to the structure of FIG. 1.

As shown in FIG. 9, when it is desired to form a continuing extension of the aluminum members 28 which is longer than a single length of member, the members 28 have two cylindrical splicing channels 66 which allow an extension segment 68 of aluminum member to be spliced at the lower end of the aluminum member, as shown in FIG. 17. The extension segment 68 has a clearance opening 70 extending through the central web 72 of the extension segment adjacent each splicing channel.

The extension member 68 is spliced to a member 28 by inserting a ¾"-10×12" threaded splicing rod 74 through each pair of abutting splicing channels. The rod 74 has a nut 76 which is applied at the clearance opening 70 of the extension member 68, the rod 74 has a cross hole (not shown) at a position within the splicing channel in the member 28, through which a cross bolt 78 extends and which is fastened by a nut 80.

It is understood that the invention is not limited to the particular construction and arrangement of parts herein illustrated and described, but embraces all such modified forms thereof as come within the scope of the following claims.

The invention claimed is:

1. A solar panel support structure comprising:
   two horizontal beams spaced from one another;
   two inclined first members each fastened by brackets between the two horizontal beams, wherein each first member has an upper head with an upwardly opening channel, and wherein each upper head has upper holes and lower holes which extend into the upwardly opening channel;
   a clamping member mounted to each of the first members, each clamping member having a base which is received within the upwardly opening channel of one of the heads of one of the two first members, wherein the base has an inclined lower surface and an inclined upper surface, and wherein each clamping member has an upper flange;
   portions of each first member head which define a lip disposed to underlie a solar panel extending between the two first members; and
   a plurality of set screws with conical interior ends, wherein when the set screws are positioned in the lower holes in the two first members, the conical interior ends of the set screws engage against the lower surfaces of the clamping member bases, and the clamping members are supported with the clamping member flanges spaced above a solar panel, and when the set screws are disposed in the upper holes in the two first members, the set screws engage against the upper inclined surfaces of the clamping member bases such that the clamping member flanges are secured against the solar panel.

2. The solar panel support structure of claim 1 further comprising a first solar panel engaged at a joint with a second solar panel and supported on the first members, and further comprising:
   portions of the first members which define lower channels; and
   an upwardly opening tray fastened between the first members positioned beneath the joint, wherein the tray has drip holes positioned at opposite ends of the tray to overlie the lower channels of the first members to thereby collect and channel rainwater falling on the solar panels which passes through the joint.

3. The solar panel support structure of claim 1 further comprising a plurality of brackets fixed to each first member and connecting the first member to the two horizontal beams and disposed at an angle of from 4 to 10 degrees from the horizontal.

4. The solar panel support structure of claim 1 wherein each first member has two vertically spaced cylindrical splicing channels, and further comprising:
   an extension segment having two vertically spaced splicing channels aligned with and adjacent to the splicing channels of one of the first members, wherein each extension segment has an upper head with an upwardly opening channel extending above a central web, and the upper head has upper holes and lower holes which extend into the upwardly opening channel, and wherein one of the clamping members has its base extending into the upwardly opening channel of each extension segment;

portions of the central web of each extension segment which define a clearance opening extending through the central web adjacent each splicing channel;

a threaded bolt extending within each splicing channel of each first member and into one of the adjacent splicing channels of the extension segment and fastened to the said first member by a transverse bolt; and a nut engaging each threaded bolt within each clearance opening of each extension segment, thereby fastening each extension segment to an adjacent first member.

5. The solar panel support structure of claim 1 further comprising:

a plurality of bifacial solar panels mounted between the first members;

a concrete pad; and a plurality of vertical members fixed to the concrete pad and supporting the horizontal beams in an elevated position, the concrete pad being positioned below the bifacial solar panels and oriented to reflect sunlight towards lower surfaces of the bifacial solar panels.

6. A solar panel support structure for mounting between two parallel horizontal beams:

a first main member and a second main member, wherein each main member has an upper head with an upwardly opening channel, and wherein each upper head has upper holes and lower holes which extend into the upwardly opening channel, and portions of each main member head define a lip disposed to underlie a solar panel;

a first clamping member and a second clamping member, wherein each clamping member has a base with a web extending therefrom to an upper flange, the base having an inclined lower surface and an inclined upper surface above the lower surface, wherein the base of the first clamping member is received within the upwardly opening channel of the first main member, and the base of the second clamping member is received within the upwardly opening channel of the second main member; and a plurality of set screws with conical interior ends engaged within the lower holes or the upper holes of the main members, wherein when the set screws are positioned in the lower holes, the set screws engage against the inclined lower surfaces of the clamping member bases, and the clamping members are supported with the clamping member flanges spaced above the main member lips to define gaps for the engagement of a solar panel therebetween with the flanges spaced from said solar panel, and when the set screws are disposed in the upper holes in the main members, the set screws engage against the upper inclined surfaces of the clamping member bases such that the clamping member flanges are secured against the solar panel.

7. The solar panel support structure of claim 6 wherein first main member and the second main member are disposed to support a plurality of solar panels with a joint between two solar panels, and further comprising:

an upwardly opening tray fastened between the first main member and the second main member beneath the joint, wherein the tray has drip holes positioned at opposite ends of the tray to overlie lower channels of the first main member and the second main member to thereby collect and channel rainwater falling on the solar panels which passes through the joint.

8. The solar panel support structure of claim 7 wherein the first main member and the second main member each have a web which extends downwardly from the head of the first main member and the head of the second main member respectively, and further comprising:

a lower U-shaped channels extending from the opposite sides of the first main member and the second main member, the U-shaped channels which face one another underlying the drip holes in the tray and thus positioned to receive rainwater from the tray.

9. The solar panel support structure of claim 6 further comprising a plurality of brackets fixed to the first main member and the second main member to connect the first main member and the second main member to two elevated horizontal beams at an angle of from 4 to 10 degrees from the horizontal.

10. The solar panel support structure of claim 6 wherein each main member has two vertically spaced cylindrical splicing channels, and further comprising:

an extension segment having two vertically spaced splicing channels aligned with and adjacent to the splicing channels of one of the main members, wherein each extension segment has an upper head with an upwardly opening channel extending above a central web, and the upper head has upper holes and lower holes which extend into the upwardly opening channel, and wherein one of the clamping members has its base extending into the upwardly opening channel of the each extension segment;

portions of the central web of each extension segment which define a clearance opening extending through the central web adjacent each splicing channel;

a threaded bolt extending within each splicing channel of each main member and into one of the adjacent splicing channels of the extension segment and fastened to the said main member by a transverse bolt; and a nut engaging each threaded bolt within each clearance opening of each extension segment, thereby fastening each extension segment to each main member.

11. A method for installing solar panels to two horizontal beams which are parallel to one another and at different elevations, the method comprising:

fixing a first main member between the two horizontal beams, such that the first main member is inclined from the horizontal;

fixing a second member between the two horizontal beams to be parallel to the first main member, wherein each main member has an upper head with an upwardly opening channel and an outwardly extending lip, and wherein each upper head has upper holes and lower holes which extend into the upwardly opening channel;

mounting a first clamping member to the first main member and a second clamping member to the second main member, each clamping member having a base which is received within one of the upwardly opening channels, wherein each base has an inclined lower surface and an inclined upper surface, and wherein each clamping member has an upper flange;

advancing set screws into the lower holes of the first main member and the second main member such that ends of the set screws engage the lower inclined surfaces of the bases of the first clamping member and the second clamping member to support the clamping member flanges spaced above the main member lips to define gaps between the first main member lip and the first clamping member flange and between the second main member lip and the second main member flange;

inserting a plurality of solar panels into the gaps, the solar panels extending between the first main member and the second main member supported on the lips and spaced from the clamping member flanges;

removing the plurality of set screws from the lower holes and inserting set screws in the upper holes; and advancing the set screws within the upper holes to urge the conical ends of the set screws against the upper inclined surfaces of the clamping members to engage the clamping member flanges with the plurality of solar panels.

12. The method for installing solar panels of claim 11 further comprising the step of partially retracting all the plurality of set screws from the lower holes to gradually lower the clamping members to engage the plurality of solar panels prior to removing the plurality of set screws from the lower holes.

13. The method for installing solar panels of claim 11 wherein the set screw ends are conical.

\* \* \* \* \*